United States Patent
Kim et al.

(10) Patent No.: US 9,185,401 B2
(45) Date of Patent: Nov. 10, 2015

(54) METHOD AND APPARATUS FOR CAMERA NETWORK CALIBRATION WITH SMALL CALIBRATION PATTERN

(75) Inventors: Jae Hean Kim, Daejeon (KR); Hyun Kang, Daejeon (KR); Ji Hyung Lee, Daejeon (KR); Bonki Koo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 426 days.

(21) Appl. No.: 13/549,323

(22) Filed: Jul. 13, 2012

(65) Prior Publication Data

US 2013/0016223 A1 Jan. 17, 2013

(30) Foreign Application Priority Data

Jul. 15, 2011 (KR) .................. 10-2011-0070354
Apr. 13, 2012 (KR) .................. 10-2012-0038466

(51) Int. Cl.
  *H04N 7/18* (2006.01)
  *H04N 17/00* (2006.01)
  *H04N 17/02* (2006.01)
  *G06K 9/00* (2006.01)

(52) U.S. Cl.
  CPC .............. *H04N 17/002* (2013.01); *G06T 7/002* (2013.01); *H04N 5/247* (2013.01); *G06T 2207/30244* (2013.01)

(58) Field of Classification Search
  CPC ....... H04N 7/18; H04N 7/181; H04N 17/002; H04N 17/00; H04N 17/02; H04N 5/247; H04N 5/217; G06T 7/002; G01B 11/022; G01B 11/024
  See application file for complete search history.

(56) References Cited

U.S. PATENT DOCUMENTS

| | | | |
|---|---|---|---|
| 6,437,823 B1* | 8/2002 | Zhang | 348/187 |
| 6,917,702 B2 | 7/2005 | Beardsley | |
| 8,401,241 B2* | 3/2013 | Chandraker et al. | 382/107 |

(Continued)

FOREIGN PATENT DOCUMENTS

KR  10-2007-0101580 A  10/2007

OTHER PUBLICATIONS

Roger Y. Tsai, "A Versatile Camera Calibration Technique for High-Accuracy 3D Machine Vision Metrology Using Off-the-Shelf TV Cameras and Lenses", IEEE Journal of Robotics and Automation, Aug. 1987, pp. 323-344, vol. RA-3 No. 4, IEEE.

(Continued)

*Primary Examiner* — Jefferey Harold
*Assistant Examiner* — Sean Haiem (57) ABSTRACT

A method for calibrating a camera network includes generating a projection matrix by each of cameras in respect of a calibration pattern that is disposed at a plurality of different positions in a photography zone. A portion of the projection matrix is produced as a sub-projection matrix. Sub-projection matrixes are arranged widthwise and lengthwise to generate one sub-measurement matrix. A singular value decomposition (SVD) is performed on the sub-measurement matrix to change the sub-measurement matrix into a matrix having a rank of 3 and a SVD is performed on the changed sub-measurement matrix. A rotation value of the calibration pattern, and an internal parameter and a rotation value of each camera are extracted to thereby calibrate the camera network.

10 Claims, 6 Drawing Sheets

(56) References Cited

U.S. PATENT DOCUMENTS

| | | | |
|---|---|---|---|
| 2003/0156189 A1* | 8/2003 | Utsumi et al. | 348/77 |
| 2008/0219509 A1* | 9/2008 | White et al. | 382/107 |
| 2011/0115921 A1* | 5/2011 | Wang et al. | 348/187 |
| 2011/0176007 A1* | 7/2011 | Ding et al. | 348/189 |

OTHER PUBLICATIONS

Zhengyou Zhang, "A Flexible New Technique for Camera Calibration", IEEE Transactions on Pattern Analysis and Machine Intelligence, Nov. 2000, pp. 1330-1134, vol. 22 No. 11, IEEE.

* cited by examiner

METHOD AND APPARATUS FOR CAMERA NETWORK CALIBRATION WITH SMALL CALIBRATION PATTERN

RELATED APPLICATION(S)

This application claims the benefit of Korean Patent Application Nos. 10-2011-0070354 and 10-2012-0038466, filed on Jul. 15, 2011 and Apr. 13, 2012, respectively, which are hereby incorporated by references as if fully set forth herein.

FIELD OF THE INVENTION

The present invention relates to a camera calibration technology, and more particularly, to an apparatus and a method for calibrating a camera network with a plurality of small calibration patterns that are disposed around a calibration target to be three-dimensionally reconstructed.

BACKGROUND OF THE INVENTION

A camera calibration operation, which calculates an internal variable and external variable of a camera, is an operation that is required to be performed prior to all operations of calculating Three-Dimensionally (3D) information with a camera.

Although various camera calibration methods have been proposed to date, a camera calibration method with calibration patterns can guarantee the most stable and precise result. However, when a target object to be three-dimensionally reconstructed has a large size, a calibration pattern increases in proportion to the target object. Such a large calibration pattern has limitations in maintenance and management thereof, and moreover, cost expended in manufacturing the large calibration pattern is inversely proportional to the degree of precision, whereby there is a limitation in establishing a camera calibration system.

To overcome such limitations, a method has been proposed that moves a light point with a user's hand to simultaneously capture the light point with a plurality of cameras, and then calibrates the captured images of the light point in a self-calibration scheme. Such a method, however, has a limitation in that time synchronization for capturing the light point among the cameras needs to be achieved.

To overcome limitations that occur in manufacturing a 3D-structure calibration pattern, a method using a calibration pattern of a Two-Dimensional (2D) structure has been proposed. However, the method using the 2D-structure calibration pattern also has a limitation in that the size of the calibration pattern increases in proportion to that of a target to be captured, and has a reduced degree of precision that is required in measuring the relative position of at least one camera disposed around the target.

Therefore, in three-dimensionally reconstructing a large target object using a camera network, there is a need to avoid the increase in a size of a calibration pattern for reconstruction in proportion to a size of the large target object.

SUMMARY OF THE INVENTION

In view of the above, the present invention provides an apparatus and method for calibrating a camera network with a plurality of small calibration patterns that are disposed around a calibration target to be three-dimensionally reconstructed.

In accordance with a first aspect of the present invention, there is provided a method for calibrating a camera network, which includes:

generating a projection matrix by each of cameras in respect of a calibration pattern at different positions where the calibration pattern in disposed;

producing a portion of the projection matrix as a sub-projection matrix;

arranging sub-projection matrixes widthwise and lengthwise to generate one sub-measurement matrix;

performing a singular value decomposition (SVD) on the sub-measurement matrix to change the sub-measurement matrix into a matrix having a rank of 3;

performing a SVD on the changed sub-measurement matrix; and extracting a rotation value of each calibration pattern, and an internal parameter and a rotation value of each camera to calibrate the camera network.

In the embodiment, the sub-projection matrix corresponds to a fore 3×3 portion of the projection matrix, and is generated by the number of cameras for the calibration pattern at a position.

In the embodiment, the extracted rotation value of the calibration pattern, the extracted internal parameter and rotation value of each camera, and the projection matrix are used to calculate a translational movement value of the camera and a translational movement value of the calibration pattern.

In accordance with a second aspect of the present invention, there is provided an apparatus for calibrating a camera network, which includes:

a sub-projection matrix generation unit configured to receive a projection matrix, which is generated by each of cameras in respect of a calibration pattern at different positions where the calibration pattern is disposed, to generate a portion of the projection matrix as a sub-projection matrix;

a sub-measurement matrix generation unit configured to arrange sub-projection matrixes generated by the sub-projection matrix generation unit widthwise and lengthwise to generate one sub-measurement matrix;

an optimization unit configured to perform a singular value decomposition (SVD) on the sub-measurement matrix to change the sub-measurement matrix to a matrix having a rank of 3; and a calibration unit configured to perform an SVD on the changed sub-measurement matrix to extract a rotation value of the calibration pattern and an internal parameter and a rotation value of each camera, thereby calibrating the camera network.

In the embodiment, the sub-projection matrix generation unit generates a fore predetermined 3×3 portion of the projection matrix as the sub-projection matrix, and the sub-projection matrix is generated by the number of cameras for the calibration pattern at a position.

In the embodiment, the calibration unit calculates a translational movement value of the camera and a translational movement value of the calibration pattern, by using the rotation value of the calibration pattern, the internal parameter and rotation value of the each camera, and the projection matrix.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
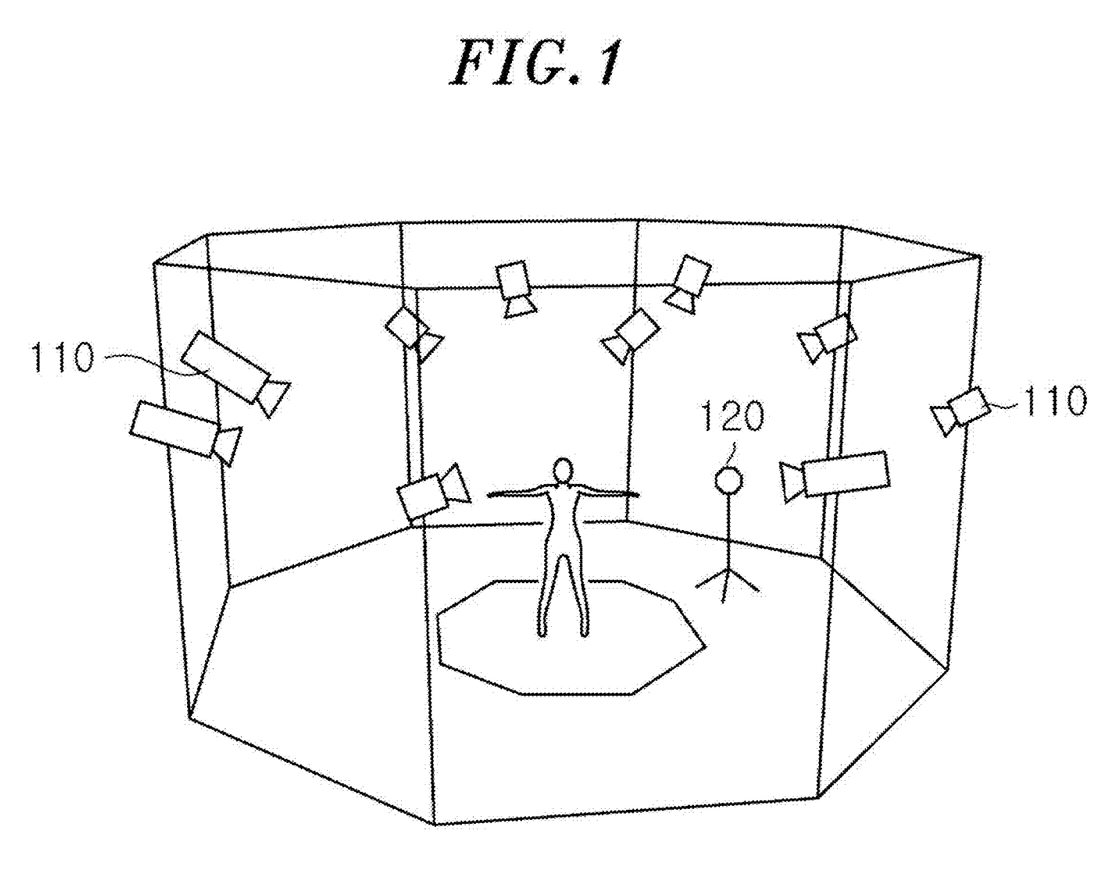
FIG. 1 is an exemplary diagram of a camera network system to which the present invention is applied.
Figure 2:
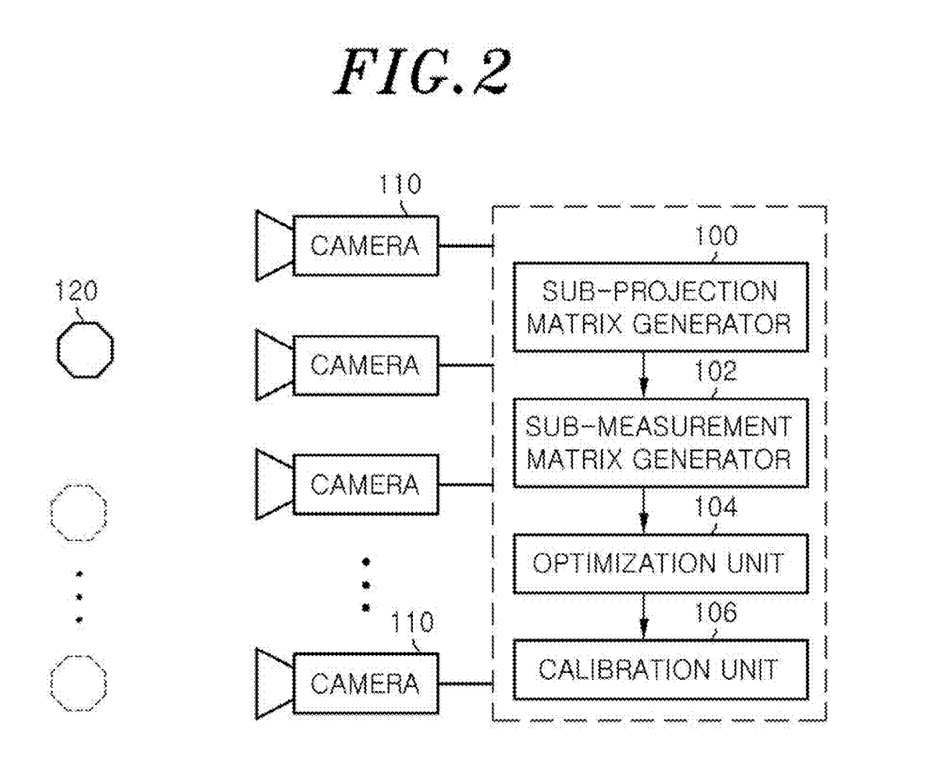
FIG. 2 is a block diagram of an apparatus for calibrating a camera network in accordance with an embodiment of the present invention.

FIG. 1 is an exemplary diagram of a camera network system to which the present invention is applied, and FIG. 2 illustrates a block configuration of an apparatus for calibrating a camera network in accordance with an embodiment of the present invention.

As shown in FIG. 1, in a camera network system, a small calibration pattern 120 that is designed and manufactured in a 3D structure is arbitrarily disposed while being moved at a plurality of different positions in a photography zone, and captured by a camera network having a number of cameras 110 that are located around the calibration pattern 120. The captured images of the calibration pattern 120 are then provided to an apparatus for calibrating the network camera shown in FIG. 2, which may be remotely located from the camera network.

FIG. 2 illustrates a block diagram of an apparatus for calibrating a camera network in accordance with an embodiment of the present invention.

The apparatus for calibrating a camera network is used for three-dimensionally reconstructing a calibration target such as a person or an object that is located at the center in the photography zone. The apparatus includes sub-projection matrix generation unit 100, a sub-measurement matrix generator 102, an optimization unit 104, and a calibration unit 106.

When capturing the calibration pattern 120 with the camera network, one projection matrix is calculated for each of the cameras 110 with respect to one calibration pattern 120 located at a position. Therefore, when the calibration patterns 120 is disposed at a plurality of different positions in which the calibration pattern is moved in the photography zone, a corresponding number of projection matrixes are calculated for each of the cameras 110.

The sub-projection matrix generation unit 100 generates a sub-projection matrix as a fore 3×3 portion of a projection matrix.

A sub-measurement matrix generation unit 102 arranges a plurality of sub-projection matrixes, which have been measured as described above, widthwise and lengthwise to generate one matrix, i.e., a sub-measurement matrix. By adjusting sub-projection matrixes respectively corresponding to factors of the sub-measurement matrix in order for a matrix equation to become 1, the sub-measurement matrix needs to be a matrix having a rank of 3.

However, the rank cannot become 3 due to image noise, and thus, the optimization unit 104 performs the following optimization operation. The optimization unit 104 performs singular value decomposition (SVD) on a sub-measurement matrix, and generates a matrix which is closest to the sub-measurement matrix and whose rank is 3, on the basis of the result of the SVD. Subsequently, the calibration unit 106 again performs an SVD on a sub-measurement matrix which has been undergone the optimization operation and whose rank is 3, and extracts an internal parameter and rotation value of each camera 110 and a rotation value of the calibration pattern 120 disposed at an arbitrary position, on the basis of the result of the SVD. At this point, the calibration unit 106 calculates a translational movement value of each camera 110 and a translational movement value of the calibration pattern 120 by using the SVD result and the projection matrix.

Hereinafter, the camera network calibration of the present invention will be described with reference to FIGS. 2 to 7 in more detail.

Figure 3:
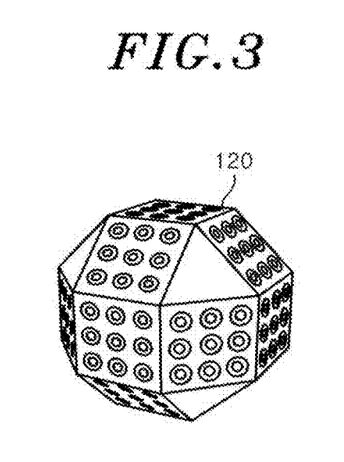
FIG. 3 is an exemplary diagram of a calibration pattern in accordance with an embodiment of the present invention.

First of all, the present invention requires the calibration pattern 120 with a 3D-structure as illustrated in FIG. 3. Although such a calibration pattern 120 is not restricted in type, the calibration pattern needs to have two or more planes to be viewed in any direction and requires satisfying one of following requirements. First, the calibration pattern should have three reference points on respective two planes which are not placed in a straight line. Second, the calibration pattern should have two reference points on one plane and four reference points on another plane, wherein any three of the four reference points are not placed in a straight line. In the calibration pattern 120 illustrated in FIG. 3, two or more planes can be viewed in any direction and more than three reference points which are not in a straight line are disposed on one plane. Therefore, a relevant condition can be satisfied. Therefore, a relevant condition can be satisfied.

Figure 4:
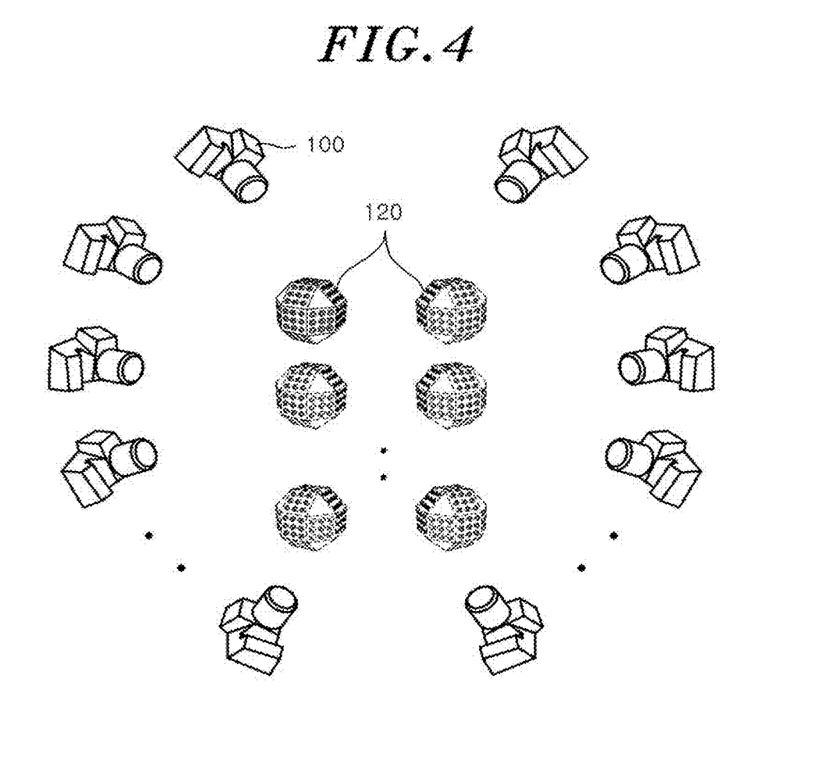
FIG. 4 illustrates that a camera network captures the calibration patterns disposed at different position.
Figure 5:
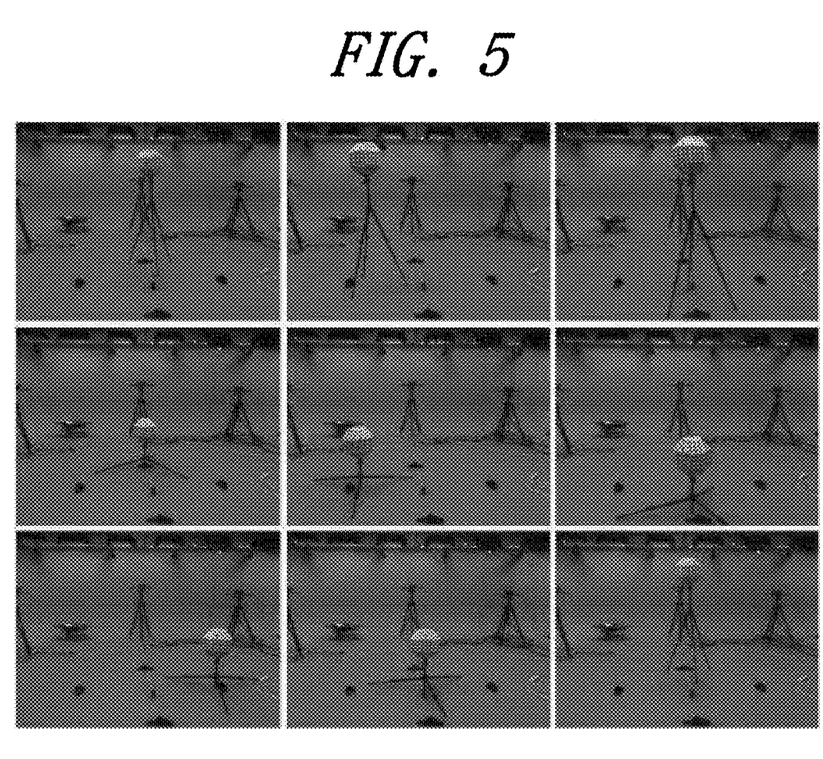
FIG. 5 is an exemplary diagram illustrating captured images of the calibration patterns.

Such a calibration pattern 120, as illustrated in FIG. 4, is disposed while being moved at different positions in a photography zone, and images of the calibration pattern 120 are captured at the different positions by the cameras 110. Here, as the different positions in which the calibration pattern is disposed increase, a good calibration result can be obtained. FIG. 5 illustrates an exemplary diagram in which captured images of the calibration pattern 120 are made at the different positions.

Figure 6:
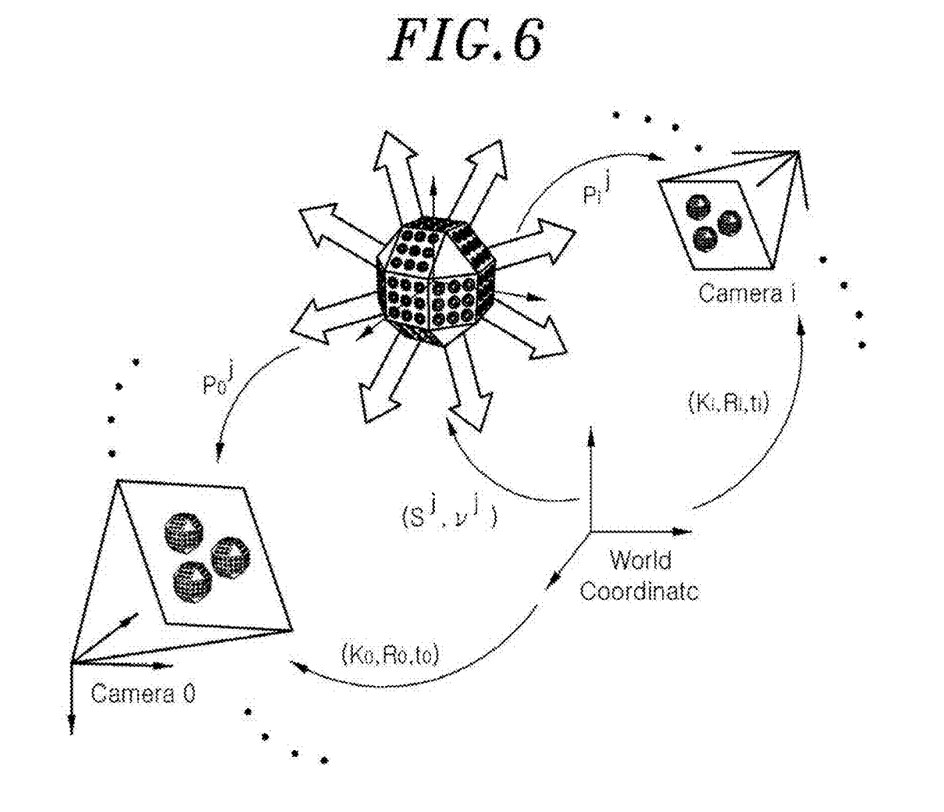
FIG. 6 is a conceptual diagram describing principle of a camera network calibration in accordance with an embodiment of the present invention.

In FIG. 6, when x indicates a reference point on a calibration pattern 120 of which position has been extracted from an image of the calibration pattern and X indicates a 3D position in an arbitrary world coordinate system of the reference point on the calibration pattern 120, the reference point x may be calculated as expressed in the following Equation (1).

$$x \cong K[Rt]X \cong MX \qquad (1)$$

where K is an internal parameters of each camera 110; R is a rotation matrix corresponding to a position of each camera 110; and t is a position vector corresponding to the position of each camera 110. A combination of the rotation matrix and position vector is collectively referred to as an external parameter of the camera 110. A sign '≅' is used as being equal in meaning only up to the relative sizes of factors of a matrix.

x in Equation (1), as illustrated in FIG. 6, may be calculated as expressed in the following Equation (2).

$$X = \begin{bmatrix} S & v \\ 0^T & 1 \end{bmatrix} X_{ref} \quad (2)$$
$$= NX_{ref}$$

where $X_{ref}$ is 3D coordinates of reference points in a reference coordinate system on the calibration pattern, S is a rotation matrix corresponding to a position of the calibration pattern, and v is a position vector corresponding to the position of the calibration pattern.

As illustrated in FIG. 6, a camera projection matrix that satisfies a relational equation such as the following Equation (3) may be obtained for each camera 110 at the position of the calibration pattern.

$$x \cong K[Rt]\begin{bmatrix} S & v \\ 0^T & 1 \end{bmatrix} X_{ref} \quad (3)$$
$$= MNX_{ref}$$
$$= PX_{ref}$$

where a matrix P that is calculated by multiplying a matrix M and a matrix N is referred to as a projection matrix. The projection matrix may be calculated by a direct linear transform (DLT) in the computer vision field. A matrix, which is calculated for an i-th camera and a j-th calibration pattern, is referred to as a projection matrix $P_i^j$.

Let's denote a fore 3×3 portion of the projection matrix as $H_i^j$, which is referred to as a sub-projection matrix. In order for a matrix equation of the sub-projection matrix to become 1, the sub-projection matrix is multiplied by a constant $\rho_i^j$ expressed as the following Equation (4).

$$\rho_i^j = \det(H_i^j)^{-1/3} \quad (4)$$

Subsequently, the sub-projection matrix is arranged widthwise and lengthwise as expressed the following Equation (5). Such a matrix is referred to as a sub-measurement matrix.

$$\begin{bmatrix} H_1^1 & \cdots & H_1^n \\ \vdots & \ddots & \vdots \\ H_m^1 & \cdots & H_m^n \end{bmatrix} \quad (5)$$

where m is the number of cameras 110, and n is the number of pattern positions 120. If a calibration pattern disposed at a specific position j is not viewed from a position of a specific camera i, a sub-projection matrix may be calculated as expressed in the following Equation (6).

$$H_i^j \cong H_i^l (H_k^l)^{-1} H_k^j \quad (6)$$

where it is assumed that $H_i^l$, $H_k^l$, and $H_k^j$ are calculated.

Such a sub-measurement matrix needs to have a rank of 3 with a relational equation such as the following Equation (7).

$$\begin{bmatrix} H_1^1 & \cdots & H_1^n \\ \vdots & \ddots & \vdots \\ H_m^1 & \cdots & H_m^n \end{bmatrix} = \begin{bmatrix} a_1 K_1 R_1 \\ \vdots \\ a_m K_m R_m \end{bmatrix}[S^1 \ldots S^n] \quad (7)$$

where $a_i$ (where i=1, . . . , m) is an arbitrary constant. However, a rank cannot accurately become 3 due to noise in measuring a reference point in the captured image of the calibration pattern 120, and thus, an optimization is performed as follows. An SVD is performed on the sub-measurement matrix, and the SVD result may then be expressed as the following Equation (8).

$$U_{3m \times 3n} D_{3n \times 3n} V_{2n \times 3n}^T \quad (8)$$

In this case, a matrix which is closest to the above-described matrix and whose rank is 3 may be calculated as expressed in the following Equation (9).

$$\bar{U}_{3m \times 3}\sqrt{D} \cdot \{\bar{V}_{2n \times 3}\sqrt{D}\}^T = \hat{U}_{3m \times 3}\hat{V}_{2n \times 3}^T \quad (9)$$

where $\sqrt{D}$ is $\text{diag}(\sqrt{\sigma_1}, \sqrt{\sigma_2}, \sqrt{D_3})$, $\bar{U}_{3m \times 3}$ is a matrix that has been obtained by leaving only the fore three columns of $U_{3m \times 3}$, and $\bar{V}_{2n \times 3}$ is a matrix that has been obtained by leaving only the fore three columns of $V_{2n \times 3n}$. In this way, a sub-measurement matrix may be expressed as the multiplication of two matrixes. As expressed in the following Equation (10), there are the types out of number due to an arbitrary matrix T.

$$(\hat{U}_{3m \times 3} T)(T^{-1}\hat{V}_{2n \times 3}^T) \quad (10)$$

However, the matrix T may be calculated as expressed in Equation $T \cong \sqrt{D} R_w$. Here, $R_w$ is associated with the setting of an arbitrary world coordinate system, and may be used as an arbitrary unit matrix. When let's be $\hat{U}_{3m \times 3}^T = [U_1^T \ldots U_m^T]$ and $\hat{V}_{2n \times 3}^T = [U_1^T \ldots U_n^T]$, $K_i$ and $R_i$ may be calculated with RQ-decomposition of $U_i^T$, and $S^j$ may be obtained by calculating a rotation matrix closest to $T^{-1}V_j^T$.

In this case, when $h_i^j$ is a fourth column of the projection matrix $P_i^j$, a relational equation such as the following Equation (11) is obtained.

$$\rho_i^j h_i^j = \mu_i^j (K_i R_i v^j + K_i t_i) \quad (11)$$

In this case, $\mu_i^j = \det(K_i)^{-1/3}$ may be calculated. $t_i$ and $v^j$ may also be calculated through the relational equation. Through the above procedure, all desired factors have been calculated. Now, the factors may be more accurately calculated by geometrically optimizing the results that have been calculated with the algebraic relationship. First, a cost function to be optimized is defined with a re-projection error as expressed in the following Equation (12).

$$\sum_{i=1}^{m}\sum_{j=1}^{n}\sum_{k \in R_i^j} \left\| \tilde{x}_i^{jk} - \hat{x}_i^{jk}(K_i, R_i, t_i, S^j, v^j, X_{ref}^k) \right\|^2 \quad (12)$$

where $R_i^j$ corresponds to an index of a reference point on the calibration pattern 120 when the calibration pattern disposed at a j-th position is viewed from an i-th camera. $\tilde{x}_i^{jk}$ is a coordinate of a reference point that has been measured when noise is being included in the image of the calibration pattern, $\hat{x}_i^{jk}$ is a re-projection coordinate of a specific reference point on the calibration pattern that has been calculated with a predetermined factor. Let's the result calculated with the algebraic relationship be an initial value, and a position of a first calibration pattern be fixed as a constant. And then, an optimization operation based on the Levenberg-Marquardt algorithm is performed on the above-described cost function, thereby obtaining the parameters more precisely.

However, a fine error may occur in manufacturing calibration pattern, and is mostly caused by a position error of each plane in the calibration pattern. A method of correcting the error is as follows.

Figure 7:
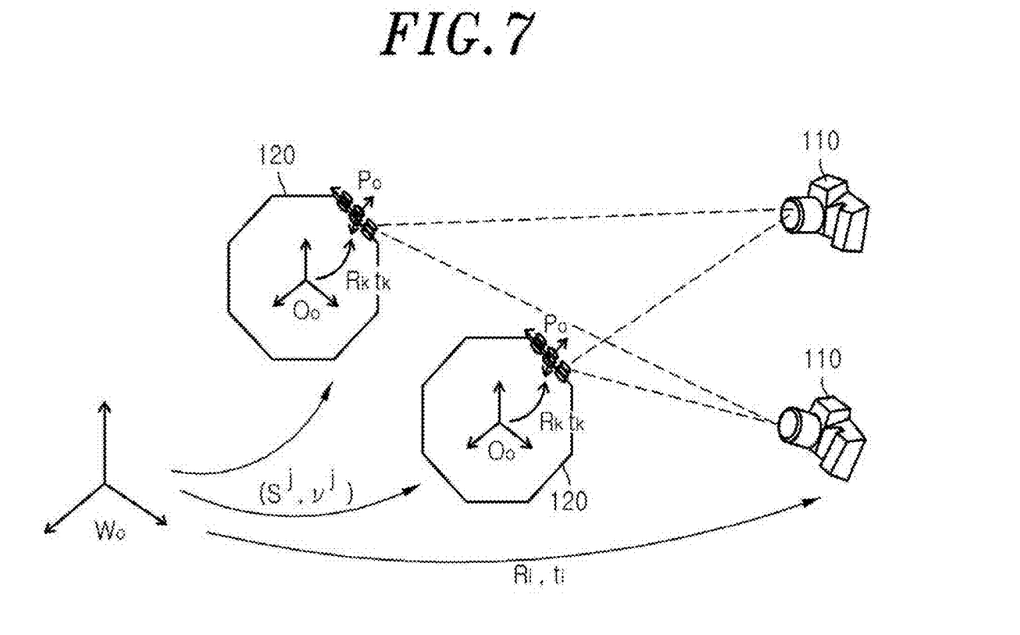
FIG. 7 is a conceptual diagram describing a principle of correcting an error occurred in manufacturing a calibration pattern in accordance with an embodiment of the present invention.

First, as illustrated in FIG. 7, a rotation matrix $R_k$ and a position vector $t_k$ indicating a position of each plane k are defined in a reference coordinate system on the calibration pattern. Hence, a new cost function including these factors $R_k$ and $t_k$ may be defined. Let's initial values of the factors $R_k$ and $t_k$ be a unit matrix and a zero vector, respectively. And then, an optimization operation is performed on the new cost function based on the Levenberg-Marquardt algorithm, whereby $R_k$ and $t_k$ may be calculated.

In FIGS. 6 and 7, $S^j$ indicates a rotation matrix of the calibration pattern at j-th position and $v^j$ indicates a position vector of the calibration pattern at j-th position.

In this case, when lens distortion additionally occurs in a camera, a factor of the lens distortion is added to the cost function, and with an initial value of the factor as 0, the lens distortion factor may be calculated by performing the optimization operation.

In accordance with the embodiment, in calibrating a camera network with a plurality of small calibration patterns, the small calibration patterns are disposed around a calibration target to be three-dimensionally reconstructed and, a plurality of cameras generates a plurality of matrix values in respect to the small calibration patterns. Therefore, the present invention enables the easier calibration of the camera network around the target object for three-dimensionally reconstructing an arbitrary object and person.

Moreover, in calibrating a camera network, a large-size calibration pattern is not required even when a calibration target is large, and thus, cost and effort expended in maintaining and managing a calibration pattern may be decreased. Also, the embodiment may overcome limitations in the degree of precision and cost that become problems in manufacturing a large calibration pattern, thus saving the establishment cost of a camera network system and enhancing the work efficiency of a worker.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for calibrating a camera network, the method comprising:
    generating a plurality of projection matrices, each projection matrix being generated for a calibration target position by a camera of the camera network;
    producing a portion of a projection matrix as a sub-projection matrix;
    arranging a plurality of sub-projection matrices widthwise and lengthwise to generate one sub-measurement matrix;
    performing, by an optimization unit, a first singular value decomposition (SVD) on the sub-measurement matrix;
    generating a matrix having a rank of 3 that is closest to the sub-measurement matrix from a result of the first SVD;
    performing, by a calibration unit, a second SVD on the matrix having the rank of 3 to produce a second SVD result; and
    using the second SVD result to extract a rotation value of each calibration pattern, and an internal parameter and a rotation value of each camera to calibrate the camera network.

2. The method of claim 1, wherein the sub-projection matrix corresponds to a 3×3 portion of the projection matrix.

3. The method of claim 1, wherein the sub-projection matrix is generated by the camera network for the calibration pattern at a position.

4. The method of claim 1, wherein the extracted rotation value of the calibration pattern, the extracted internal parameter and rotation value of each camera, and the projection matrix are used to calculate a translational movement value of the camera and a translational movement value of the calibration pattern.

5. An apparatus for calibrating a camera network, the apparatus comprising:
    a sub-projection matrix generation unit configured to receive a projection matrix, which is generated by a camera of the camera network with respect to a calibration pattern position, and to generate a portion of the projection matrix as a sub-projection matrix;
    a sub-measurement matrix generation unit configured to arrange a plurality of sub-projection matrices generated by the sub-projection matrix generation unit widthwise and lengthwise to generate one sub-measurement matrix;
    an optimization unit configured to perform a first singular value decomposition (SVD) on the sub-measurement matrix and to generate a matrix having a rank of 3 that is closest to the sub-measurement matrix from a result of the first SVD; and
    a calibration unit configured to perform a second SVD on the matrix having the rank of 3 to produce a second SVD result, and to extract a rotation value of the calibration pattern and an internal parameter and a rotation value of each camera using the second SVD result, thereby calibrating the camera network.

6. The apparatus of claim 5, wherein the sub-projection matrix generation unit generates a predetermined 3×3 portion of the projection matrix as the sub-projection matrix.

7. The apparatus of claim 5, wherein the sub-projection matrix is generated by camera network for the calibration pattern at a position.

8. The apparatus of claim 5, wherein the calibration unit calculates a translational movement value of the camera and a translational movement value of the calibration pattern, by using the rotation value of the calibration pattern, the internal parameter and rotation value of each camera, and the projection matrix.

9. The method of claim 1, wherein the calibration pattern has at least two planes, and at least three reference points disposed on the at least two planes, the at least three reference points being offset from one another so that they are not arranged in a straight line.

10. The apparatus of claim 5, wherein the calibration pattern has at least two planes, and at least three reference points disposed on the at least two planes, the at least three reference points being offset from one another so that they are not arranged in a straight line.

* * * * *